United States Patent
Komaba

(10) Patent No.: US 8,031,859 B2
(45) Date of Patent: Oct. 4, 2011

(54) STAGNATION-JUDGMENT DEVICE AND COMPUTER PRODUCT

(75) Inventor: Yusuke Komaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1023 days.

(21) Appl. No.: 11/905,143

(22) Filed: Sep. 27, 2007

(65) Prior Publication Data

US 2008/0154963 A1 Jun. 26, 2008

(30) Foreign Application Priority Data

Dec. 20, 2006 (JP) .................... 2006-343189

(51) Int. Cl.
*H04M 3/00* (2006.01)
*H04M 5/00* (2006.01)

(52) U.S. Cl. ......... 379/265.06; 379/265.01; 379/265.02; 379/265.12

(58) Field of Classification Search ............. 379/265.06, 379/265.01, 265.02, 265.12
See application file for complete search history.

(56) References Cited

U.S. PATENT DOCUMENTS 5,006,992 A * 4/1991 Skeirik ..................... 706/58
2007/0071222 A1 * 3/2007 Flockhart et al. ........ 379/265.02

FOREIGN PATENT DOCUMENTS

| JP | 2000-253149 | 9/2000 |
| JP | 2001-109712 | 4/2001 |
| JP | 2003-309656 | 10/2003 |
| JP | 2004-252668 | 9/2004 |
| JP | 2005-293180 | 10/2005 |

OTHER PUBLICATIONS

Japanese Office Action for corresponding Japanese Application 2006-343189; mailed May 19, 2009.
Japanese Office Action for corresponding Japanese application 2006-343189; issued Dec. 8, 2009.

* cited by examiner

*Primary Examiner* — Quynh Nguyen
(74) *Attorney, Agent, or Firm* — Fujitsu Patent Center

(57) ABSTRACT

In a stagnation-judgment device, a work history-acquiring unit acquires work history of actions taken by an operator to handle an enquiry. A correlation-deriving unit derives correlation between actions of the operator and stagnation based on the work history regarding past enquiries. A stagnation-judgment unit judges whether the operator is in a state of stagnation by checking the work history regarding a current enquiry and the correlation derived by the correlation-deriving unit. A warning unit issues a warning when the operator is in the state of stagnation.

9 Claims, 12 Drawing Sheets

FIG.3

| ENQUIRY ID | OPERATOR ID | STARTING TIME | ENDING TIME | ... |
|---|---|---|---|---|
| Q10501 | OP001 | 2006/06/28 10:02:43 | 2006/06/28 10:26:34 | ... |
| Q10502 | OP002 | 2006/06/28 10:06:37 | 2006/06/28 10:15:09 | ... |
| Q10503 | OP003 | 2006/06/28 10:13:22 | 2006/06/28 10:24:19 | ... |
| Q10504 | OP007 | 2006/06/28 10:18:56 | - | ... |
| ... | ... | ... | ... | ... |

FIG.4

| ENQUIRY ID | OPERATOR ID | MATERIAL IDENTIFIER | STARTING TIME |
|---|---|---|---|
| Q10501 | OP001 | file://data/net/script_001.doc | 2006/06/28 10:06:12 |
| Q10502 | OP002 | file://data/net/script_001.doc | 2006/06/28 10:06:55 |
| Q10502 | OP002 | file://data/firewall/script_027.doc | 2006/06/28 10:09:20 |
| Q10501 | OP001 | http://www.abc.com/search?q=ABC | 2006/06/28 10:13:50 |
| Q10503 | OP003 | file://data/net/script_001.doc | 2006/06/28 10:14:03 |
| Q10501 | OP001 | http://www.xyz.co.jp/products/abc.html | 2006/06/28 10:15:10 |
| Q10503 | OP003 | file://data/firewall/script_027.doc | 2006/06/28 10:17:37 |
| Q10504 | OP007 | file://data/net/script_001.doc | 2006/06/28 10:20:04 |
| Q10505 | OP007 | http://www.abc.com/search?q=ABC | 2006/06/28 10:27:47 |
| Q10504 | OP007 | http://www.xyz.co.jp/products/abc.html | 2006/06/28 10:29:21 |
| ... | | | ... |

FIG.7

| ENQUIRY ID | OPERATOR ID | MATERIAL IDENTIFIER | REFERENCE TIME | STATUS | DEGREE OF SKILL-DEVIATION |
|---|---|---|---|---|---|
| Q10501 | OP001 | file://data/net/script_001.doc | 7:38 | NORMAL | -40 |
| Q10502 | OP002 | file://data/net/script_001.doc | 2:25 | NORMAL | -35 |
| Q10502 | OP002 | file://data/firewall/script_027.doc | 5:49 | NORMAL | -5 |
| Q10501 | OP001 | http://www.abc.com/search?q=ABC | 1:20 | NORMAL | 5 |
| Q10503 | OP003 | file://data/net/script_001.doc | 3:34 | NORMAL | -25 |
| Q10501 | OP001 | http://www.xyz.co.jp/products/abc.html | 11:24 | STAGNATED | 15 |
| Q10503 | OP003 | file://data/firewall/script_027.doc | 6:42 | NORMAL | -5 |
| ... | ... | ... | ... | ... | ... |

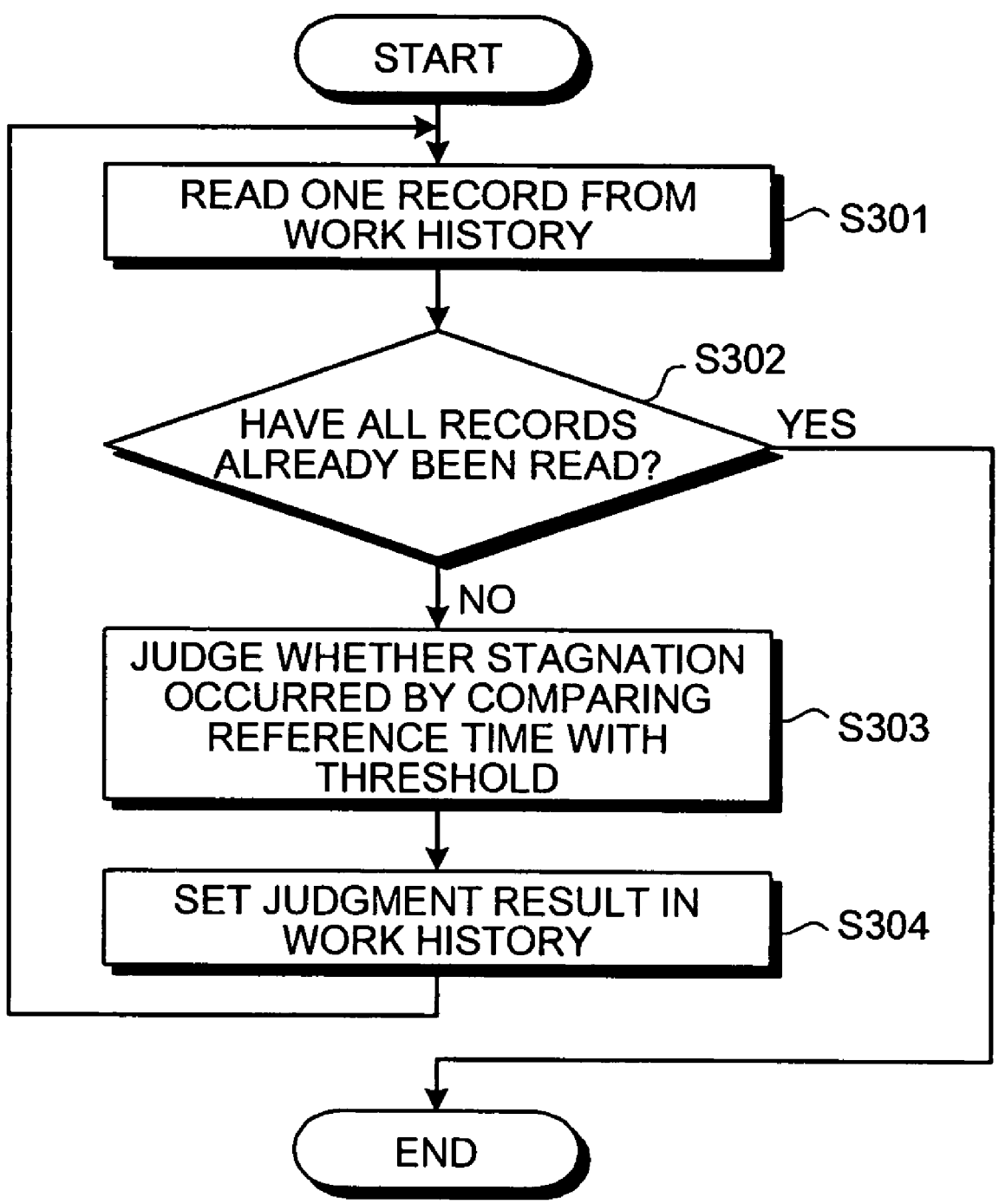

FIG.10

| PREMISE | CONCLUSION | DEGREE OF SUPPORT | DEGREE OF RELIABILITY |
|---|---|---|---|
| (((file://data/net/script_001.doc, <0, 120-180), (file://data/firewall/script_027.doc, <0, 300-480)) | NORMAL | 0.48 | 0.99 |
| (((file://data/net/script_001.doc, <0, 180-240), (file://data/firewall/script_027.doc, <0, 300-480)) | NORMAL | 0.18 | 0.85 |
| (((file://data/net/script_001.doc, <0, 420-480), (http://www.abc.com/search?q=ABC, 0-10, 60-120), (http://www.xyz.co.jp/products/abc.html, 10-20, 600- | STAGNATED | 0.21 | 0.7 |
| ... | ... | ... | ... |

STAGNATION-JUDGMENT DEVICE AND COMPUTER PRODUCT

BACKGROUND OF THE INVENTION

1. Field of the Invention

The present invention relates to a stagnation-judgment device and a computer product.

2. Description of the Related Art

For efficient management of a call center, enquiries from customers are assigned according to skills of individual operators. For example, Japanese Patent Application Laid-Open No. 2000-253149 discloses a conventional technology in which, because a high-skilled operator takes shorter time to answer an enquiry than a low-skilled operator, the skill of the operators is judged from past records of time and other factors.

Even if assignment of enquiries is done effectively, the operator to whom an enquiry is assigned is not always able to finish the enquiry in appropriate time period. Because the range of contents of enquiries from the customers is wide, it is not always easy for an operator to reply an enquiry even if the skill level of the operator is comparatively high in the technological area corresponding to an enquiry.

Generally, when an operator realizes that he is not able to handle the enquiry, he transfers the enquiry to another operator with better skills. However, if this judgment is delayed, it undermines efficiency of the call center, prolongs waiting period for the customer, and undermines customer satisfaction.

A situation called stagnation occurs when the operator does not transfer the enquiry that he is not able to handle, and keeps the enquiry pending. It is necessary to avoid occurrence of stagnation to improve efficiency of the call center, and for better satisfaction of the customers. The conventional technology described above does not contribute to improvement of operation after the enquiry is assigned. Therefore, it is not possible to avoid occurrence of stagnation.

SUMMARY OF THE INVENTION

It is an object of the present invention to at least partially solve the problems in the conventional technology.

According to an aspect of the present invention, a stagnation-judgment device that judges whether an operator is in a state of stagnation includes an acquiring unit that acquires work record of the operator including first information regarding actions taken by the operator to handle a current enquiry from a customer and second information regarding actions taken by the operator to handle past enquiries; a deriving unit that derives correlation between the actions taken by the operator and stagnation based on the second information; a judging unit that judges whether the operator is in the state of stagnation by checking the first information based on the correlation; and an outputting unit that outputs warning when the operator is judged to be in the state of stagnation.

According to another aspect of the present invention, a method of judging whether an operator is in a state of stagnation includes acquiring work record of the operator including first information regarding actions taken by the operator to handle a current enquiry from a customer and second information regarding actions taken by the operator to handle past enquiries; deriving correlation between the actions taken by the operator and stagnation based on the second information; judging whether the operator is in the state of stagnation by checking the first information based on the correlation; and outputting warning when the operator is judged to be in the state of stagnation.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 depicts an example of enquiry history in a tabular form;

FIG. 4 depicts an example of work history in a tabular form;

FIG. 7 depicts another example of the work history in a tabular form;

FIG. 8 is a detailed flowchart of a status judgment process shown in FIG. 6;

FIG. 10 depicts an example of data on stagnation judgment conditions in a tabular form;

DETAILED DESCRIPTION OF THE PREFERRED EMBODIMENTS

Exemplary embodiments of the present invention are explained in detail below with reference to the accompanying drawings.

Figure 1:
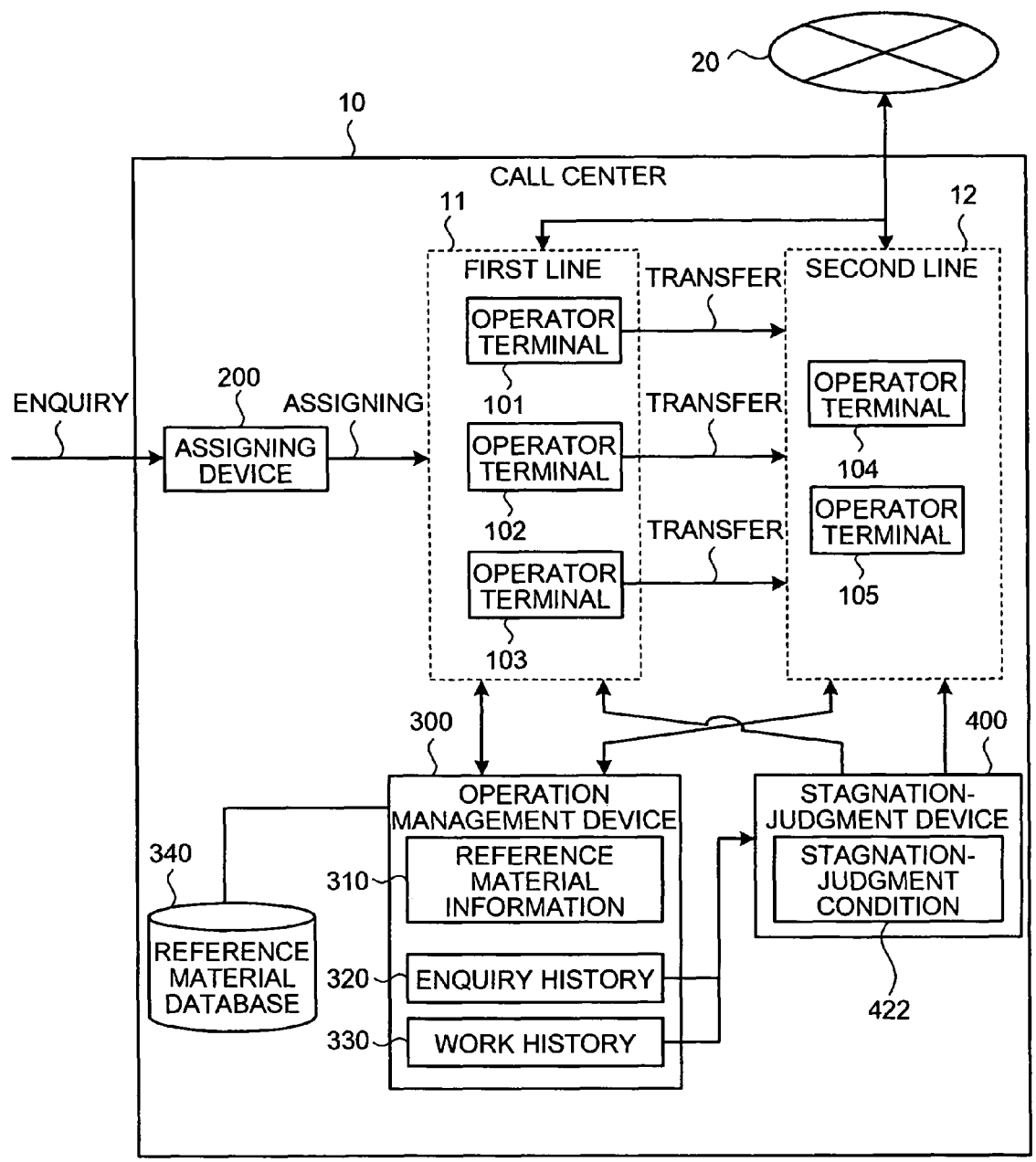
FIG. 1 is a schematic diagram of a call center according to an embodiment of the present invention.

FIG. 1 is a schematic diagram of a call center 10. Operator terminals 101 to 105, an assigning device 200, and an operation management device 300 are installed in the call center 10.

The operator terminals 101 to 105 are operated by operators who handle enquiries from customers. Out of these operator terminals, the operator terminals 101 to 103 belong to a first line 11, and the operator terminals 104 and 105 belong to a second line 12. The first line 11 is a set of operator terminals that are operated by the operators who receive enquiries temporarily, and the second line 12 is a set of operator terminals that are operated by the operators who take charge of enquiries transferred to them by the operators in the first line 11.

The assigning device 200 assigns the enquiries from the customers to the operator terminals that belong to the first line 11. The assigning device 200 assigns the enquiries simply based on the availability of operators, or according to the skill of the operators. The enquiries from the customers can be from a telephone line or from a network in the form of e-mail.

The operation management device 300 supports work of the operators of the operator terminals 101 to 105, and records work information as well. The operation management device 300 stores therein reference material information 310, enquiry history 320, and work history 330. The operation management device 300 is connected to a reference material database 340.

Specifically, the operation management device 300 receives search conditions for searching a reference material necessary for handling an enquiry as input, searches information related to the reference material that satisfies the search conditions from the reference material information 310, and outputs hit information. The reference material information 310 contains information associated with identifiers for accessing the reference materials, summary of the reference materials, and various keywords for search of the reference materials that are stored in the reference material database 340 and reference materials that are available on the Internet 20.

The enquiry history 320 stores therein history (log) of enquiries received by the operator terminals 101 to 105. The work history 330 stores therein history of reference materials that have been referred to by the operator terminals 101 to 105.

Figure 2:
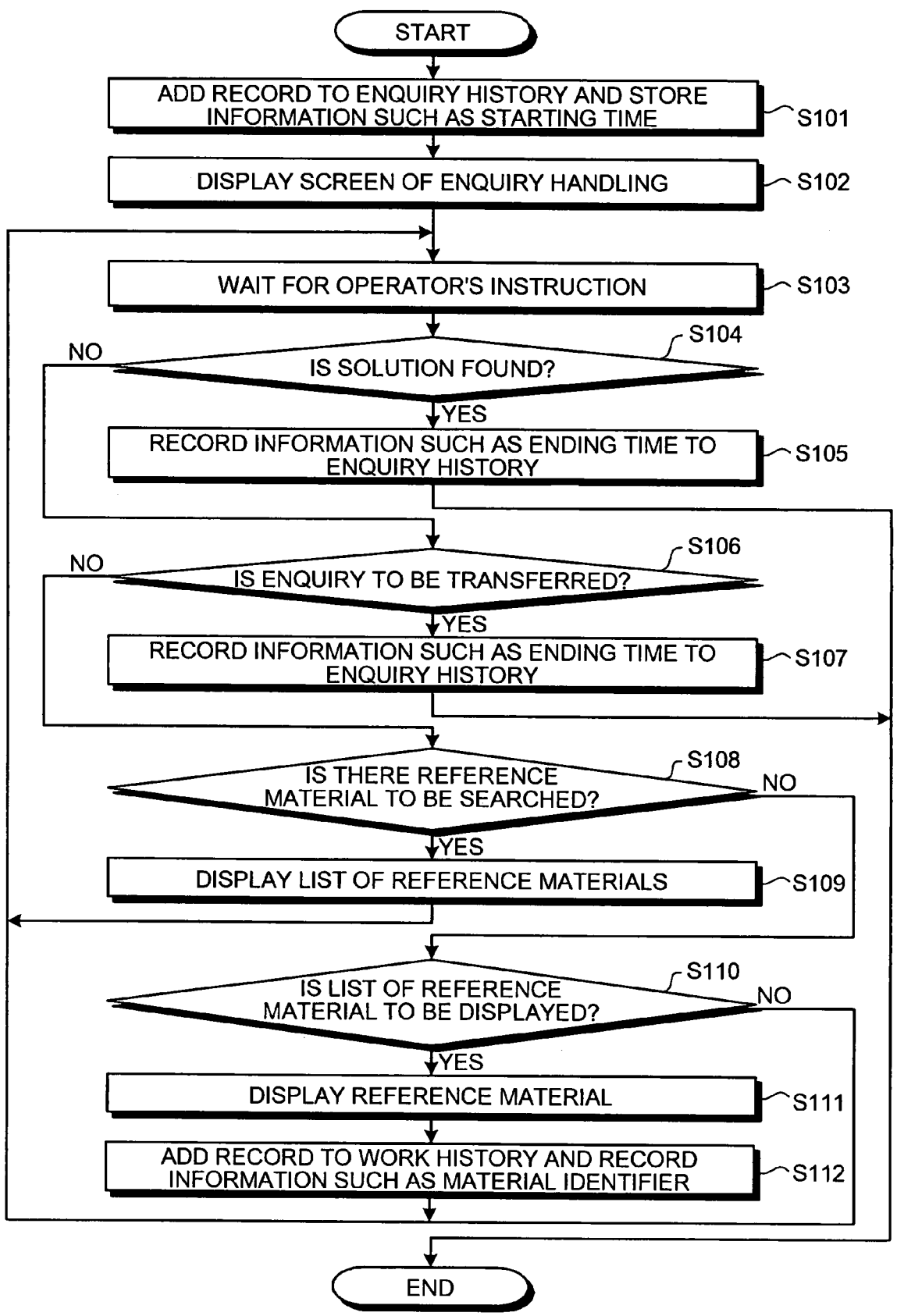
FIG. 2 is a flowchart of a process performed by an operator terminal shown in FIG. 1.

The process for handling the enquiry from the time the operator terminals 101 to 105 receive the enquiry to the completion of the process is indicated in FIG. 2. An arbitrary operator terminal among the operator terminals 101 to 105 will be referred to as an operator terminal 10x. As shown in FIG. 2, when the operator terminal 10x receives an enquiry, the operator terminal 10x instructs the operation management device 300 to add record of information such as starting time to the enquiry history 320 (step S101).

The operator terminal 10x displays a screen for handling enquiries (step S102), and waits for an instruction from the operator of the operator terminal 10x (step S103). If there is an indication from the operator that solution is found for the enquiry (Yes at step S104), the operator terminal 10x instructs the operation management device 300 to record information such as ending time in the enquiry history 320, and the process is complete (step S105).

If the operator is unable to solve the enquiry (No at step S104) and if the operator decides to transfer the enquiry to other operator terminal (Yes at step S106), the operator terminal 10x transfer the enquiry to the other operator terminal, and instructs the operation management device 300 to record information such as ending time in the enquiry history 320, and the process is complete (step S107).

If the operator decides not to transfer the enquiry, i.e., decides to handle the enquiry himself, (No at step S106), the operator terminal 10x decides if the operator specifies search conditions for the reference materials (step S108). If the operator terminal 10x decides that the operator has specified search conditions for the reference materials (Yes at step S108), the operator terminal 10x sends the specified search conditions to the operation management device 300, and receives in response a list of reference materials from the operation management device 300 and displays the list (step S109). Then, the operator terminal 10x waits for a subsequent instruction from the operator (step S103). The list contains information such as summary of each of the reference materials.

If the operator terminal 10x decides that the operator has not specified search conditions for the reference materials (No at step S108), then the operator terminal 10x decides if the operator demands detailed display regarding any one of the reference materials (step S110). If the operator terminal 10x decides that the operator has demanded detailed display of the reference material (Yes at step S110), the operator terminal 10x acquires the demanded reference material from the reference material database 340 or from the Internet 20, and displays the demanded reference material (step S111). Subsequently, the operator terminal 10x instructs the operation management device 300 to record in the work history 330 that the reference material is displayed (step S112), and waits for a subsequent instruction from the operator (step S103). If the operator terminal 10x decides that the operator has not demanded detailed display of the reference material (No at step S110), the operator terminal 10x waits for a subsequent instruction from the operator (step S103).

FIG. 3 depicts an example of the enquiry history 320 in a tabular form. The enquiry history 320 includes items such as enquiry identifier (ID), operator ID, starting time, and ending time. The operation management device 300 allocates a unique enquiry ID to each enquiry from a customer.

The operation management device 300 allocates a unique operator ID to each operator who is allocated to an enquiry from a customer. A starting time is a time point at which an operator starts handling of an enquiry, and an ending time is a time point at which an operator ends handling of an enquiry. If an operator transfers an enquiry to another operator, the ending time is a time point at which the enquiry is transferred. When the operator is in the process of handling the enquiry, the ending time remains unset as indicated in line four of the enquiry history 320 shown in FIG. 3.

FIG. 4 depicts an example of contents of the work history 330 in tabular form. The work history 330 includes items such as enquiry ID, operator ID, material identifier, and starting time. An enquiry ID is a unique code used for identifying an enquiry for handling of which a reference material indicated by the material identifier is used. The enquiry ID corresponds to the enquiry ID in the enquiry history 320 shown in FIG. 3.

An operator ID is a unique code used for identifying an operator who referred to a reference material indicated by the material identifier, and corresponds to the operator ID in the enquiry history 320 shown in FIG. 3. A material identifier is a unique code used for identifying a location of a referred material. Specifically, the material identifier indicates location of a reference material stored in the reference material database 340 and the one available on the Internet 20, for example, represented in Uniform Resource Locator (URL). A starting time is a time point at which an operator starts referring of a reference material.

Returning to the explanation of FIG. 1, a stagnation-judgment device 400 monitors whether an operator is in a state of stagnation. If the operator is in the state of stagnation, the stagnation-judgment device 400 performs a process of warning. Specifically, the stagnation-judgment device 400 refers to the enquiry history 320 and the work history 330 to monitor how the operator is handling the enquiry. If the handling state of the operator and a stagnation-judgment condition 422 stored in the stagnation-judgment device 400 match, the stagnation-judgment device 400 judges that the operator is in the state of stagnation. If the operator is in the state of stagnation, the stagnation-judgment device 400 performs the process of warning.

Figure 5:
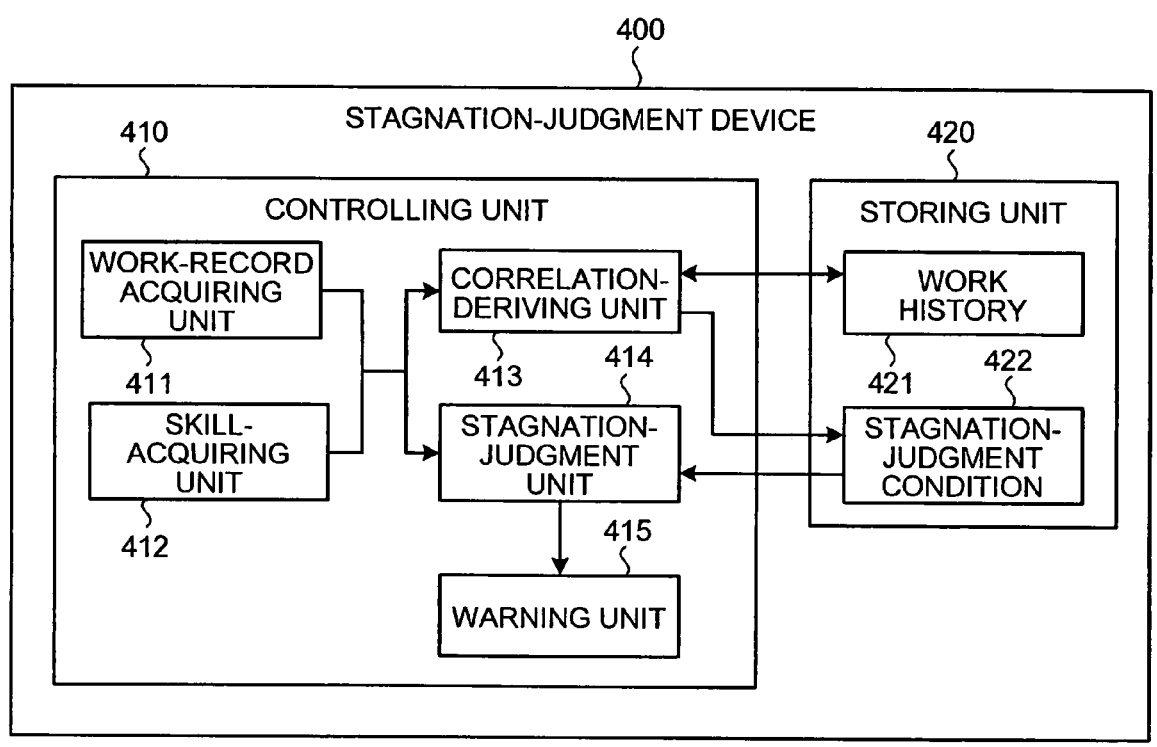
FIG. 5 is a functional block diagram of a stagnation-judgment device shown in FIG. 1.

Explained below is the structure of the stagnation-judgment device 400. FIG. 5 is a functional block diagram of the stagnation-judgment device 400. The stagnation-judgment device 400 includes a controlling unit 410 and a storing unit 420. The controlling unit 410 controls the stagnation-judgment device 400, and includes a work-record acquiring unit 411, a skill-acquiring unit 412, a correlation-deriving unit 413, a stagnation-judgment unit 414, and a warning unit 415.

The work-record acquiring unit 411 acquires the enquiry history 320 and the work history 330 from the operation management device 300. The skill-acquiring unit 412 acquires information that indicates level of the operator's skill. The level of skill can be calculated from the time required for handling an enquiry or can be assessed by the managers in the call center.

The correlation-deriving unit 413 derives correlation between the reference material that the operator referred to during handling of the enquiry and occurrence of stagnation based on the information acquired by the work-record acquiring unit 411 and the skill-acquiring unit 412. Derived results are stored in the storing unit 420 as the stagnation-judgment conditions 422.

Figure 6:
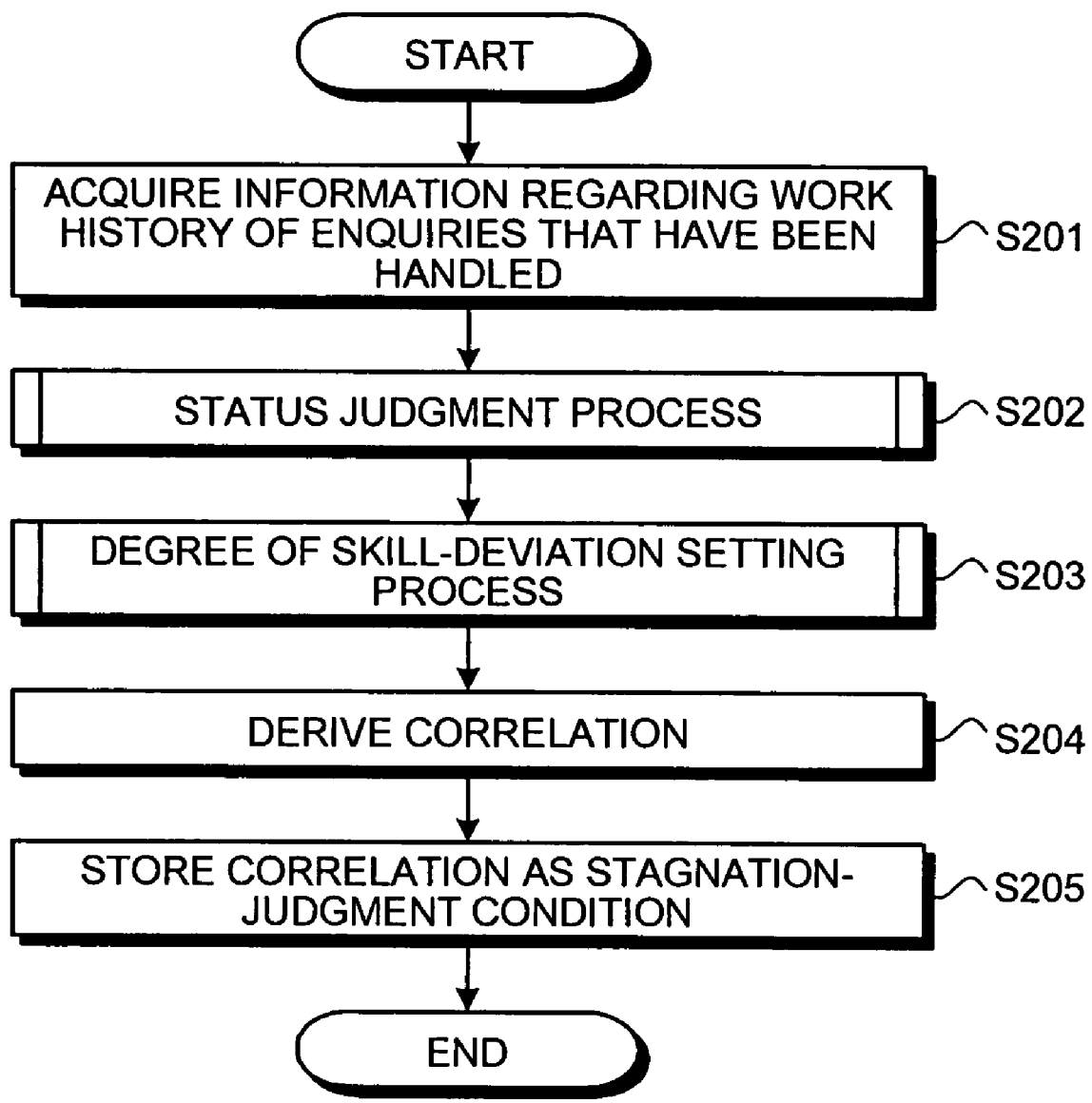
FIG. 6 is a flowchart of a process performed by a correlation-deriving unit shown in FIG. 5.

FIG. 6 is a flowchart of a process performed by the correlation-deriving unit 413. As shown in FIG. 6, the correlation-deriving unit 413 instructs the work-record acquiring unit 411 to acquire information regarding enquiries that have been handled from the enquiry history 320 and the work history 330. Acquired information is stored in the storing unit 420 as work history 421 (step S201).

FIG. 7 depicts an example of the work history 421 in a tabular form. The work history 421 includes items such as enquiry ID, operator ID, material identifier, reference time, status, and degree of skill-deviation. An enquiry ID is a unique code for identifying the enquiry for handling of which a reference material indicated by the material identifier is referred to, and corresponds to the enquiry ID in the enquiry history 320.

An operator ID is a unique code for identifying an operator who referred to a reference material indicated by the material identifier, and corresponds to the operator ID in the enquiry history 320. A material identifier indicates location of the referred material stored in the reference material database 340 and the one available on the Internet 20, for example, represented in a URL. A reference time is a time point at which the reference material indicated by the material identifier is referred to. The reference time can be obtained by calculating difference between the time when reference of the reference material is started, and the time when the reference to next reference material is started or the time required for completion of handling of the enquiry.

A status indicates whether stagnation occurred while the reference material indicated by the material identifier is being referred to. A degree of skill-deviation indicates deviation between skill required to refer to the reference material indicated by the material identifier and the skill of the operator. Columns for the status and the degree of skill-deviation remain blank until step S201 is completed.

The correlation-deriving unit 413 executes a process of status judgment, which is described later, and sets a value for status entry in the work history 421 (step S202). The correlation-deriving unit 413 executes a degree of skill-deviation setting process, and sets a value in the column of the degree of skill-deviation (step S203). The correlation-deriving unit 413 derives correlation between the operator's work (the referred reference material and the time required for reference) stored in the work history 421, the operator's skill, and occurrence of stagnation (step S204), a result of which is stored as the stagnation-judgment condition 422 (step S205).

The correlation can be derived by using an ordinarily known method of correlation analysis, which is based on degree of reliability and support, or by using a method of memory based reasoning (MBR). The process of generating the stagnation-judgment condition 422 can be performed as a batch by a designated time or it can be performed as a real time process while observing the enquiry history 320 and the work history 330.

FIG. 8 is a detailed flowchart of the status judgment process shown in FIG. 6. As shown in FIG. 8, the correlation-deriving unit 413 reads one record from the work history 421 (step S301). If all the records have already been read (Yes at step S302), process of the status judgment is complete.

On the other hand, if there are any records still to be read by the correlation-deriving unit 413 (No at step S302), reference time is compared with the threshold to judge whether the operator is in the state of stagnation (step S303), result of the judgment is set in the status entry of the work history 421 (step S304). The system control returns to step S301, and the correlation-deriving unit 413 reads the next record.

Judgment of whether the operator is in the state of stagnation can be made by considering time that elapsed since handling of the enquiry started, rather than just the reference time required for referring to an individual reference material.

Figure 9:
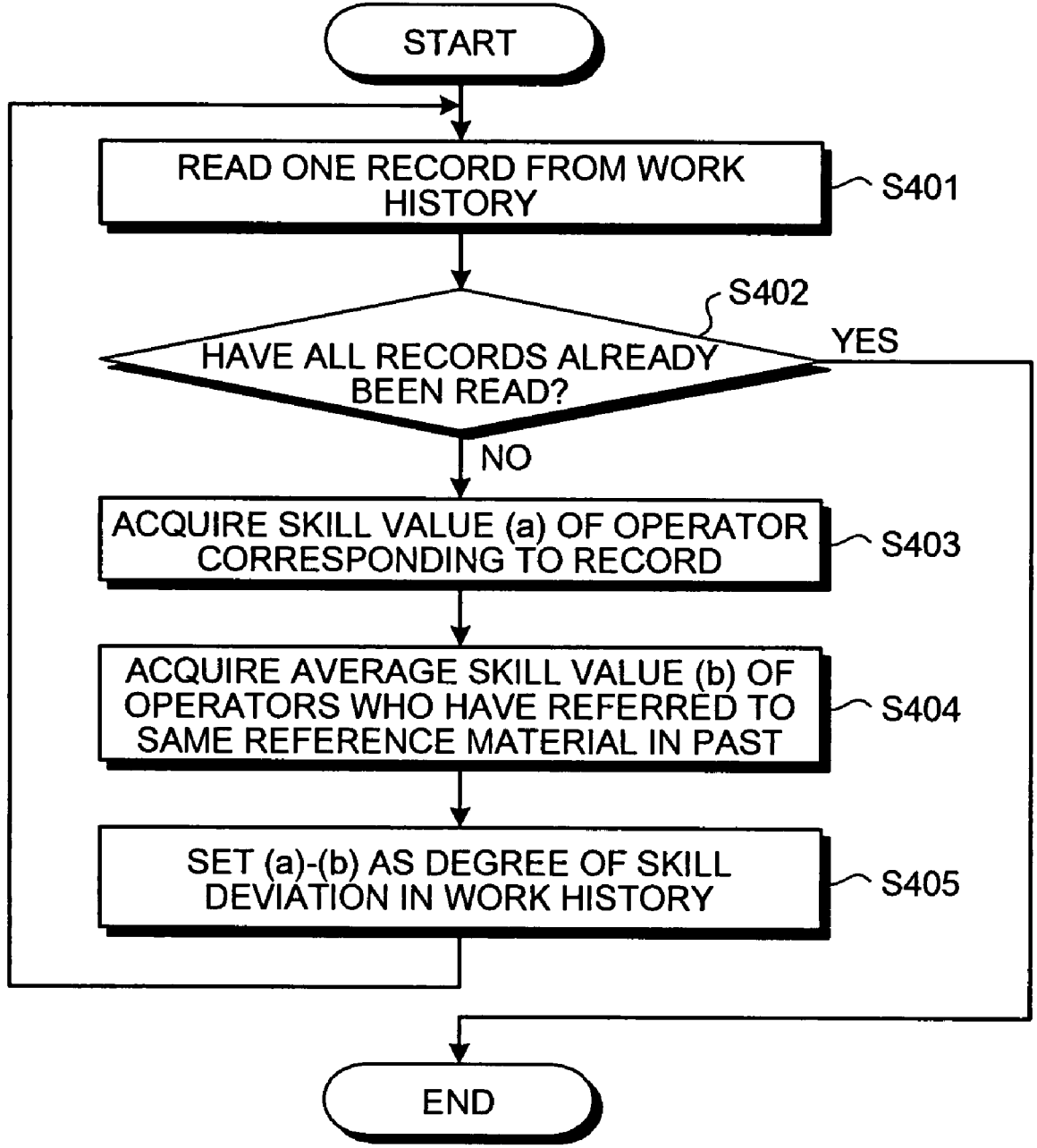
FIG. 9 is a detailed flowchart of a degree of skill-deviation setting process shown in FIG. 6.

FIG. 9 is a detailed flowchart of the degree of skill-deviation setting process shown in FIG. 6. As shown in FIG. 9, the correlation-deriving unit 413 reads one record from the work history 421 (step S401). If all the records have already been read (Yes at step S402), the degree of skill-deviation setting process is complete.

On the other hand, if there are any records still to be read in the work history 421 (No at step S402), the correlation-deriving unit 413 instructs the skill-acquiring unit 412 to acquire the skill value (a) of the operator indicated by a corresponding operator ID in the record (step S403).

Subsequently, the correlation-deriving unit 413 instructs the work-record acquiring unit 411 to acquire operator IDs of operators who have referred to the same reference material in the past, and instructs the skill-acquiring unit 412 to acquire skill values of those operators. Average of acquired skill values (b) is obtained (step S404). Difference between the skill value (a) acquired at step S403 and the average of the skill values (b) obtained at step S404 is set as the degree of skill-deviation in the entry of the work history 421 (step S405). The system control returns to step S301 and the correlation-deriving unit 413 reads the next record.

The average of the skill values obtained at step S404 indicates the degree of difficulty of the material. As explained earlier, the operator operates the operator terminals 101 to 105, and searches for the material required to handle the enquiry. However, summary of the reference material corresponding to the search condition, indicated by the operator, is displayed in a column in the reference material. Thus, it is considered that operators refer to the reference material by selecting the reference material according to their own skill level.

In other words, in the case of a reference material with lower degree of difficulty, because an operator with higher level of skill is already aware of the contents, it is an operator with lower level of skill who refers to the reference material. On the other hand, in the case of a reference material with higher degree of difficulty, because it is possible to assess high degree of difficulty from the contents of the summary of the reference material, it is the operator with higher level of skill who refers to such reference material.

Thus, it is possible to assess the degree of difficulty of the reference material by obtaining average skill value of the operator who has referred to the reference material. The degree of skill-deviation is a difference between the average skill value and the skill value of the operator, which indicates whether the operator has sufficient skill to understand contents of the reference material or is lacking such skill.

FIG. 10 is an example of data in the stagnation-judgment condition 422 that is created by correlated analysis based on the degree of reliability and the degree of support. In the example shown in FIG. 10, the contents of the work history 421 are categorized on the basis of, if the enquiry is ending in an ordinary manner, what reference material is referred to in which order until stagnating, degree of skill-deviation of the operator who handled the enquiry, and the reference time required for referring to the reference material. Based on correlated analysis of all these factors, it is assessed if the operator is in the state of stagnation.

Information with high degree of reliability and high degree of support alone is stored in the stagnation-judgment condition 422. The correlated analysis of the above mentioned factors and stagnation can be done, based only on which reference material is referred to in which order, or based on which reference material is referred to in which order and the degree of skill-deviation of the operator.

Returning to the explanation of FIG. 5, the stagnation-judgment unit 414 acquires handling measures currently taken by the operator, based on the information acquired by the work-record acquiring unit 411 and the skill-acquiring unit 412, checks acquired information with the stagnation-judgment condition 422, and judges whether the operator is in the state of stagnation. If the stagnation-judgment unit 414 judges that the operator is in the state of stagnation, the warning unit 415 outputs warning to the operator terminals 101 to 105, and prompts transfer of the enquiry.

Figure 11:
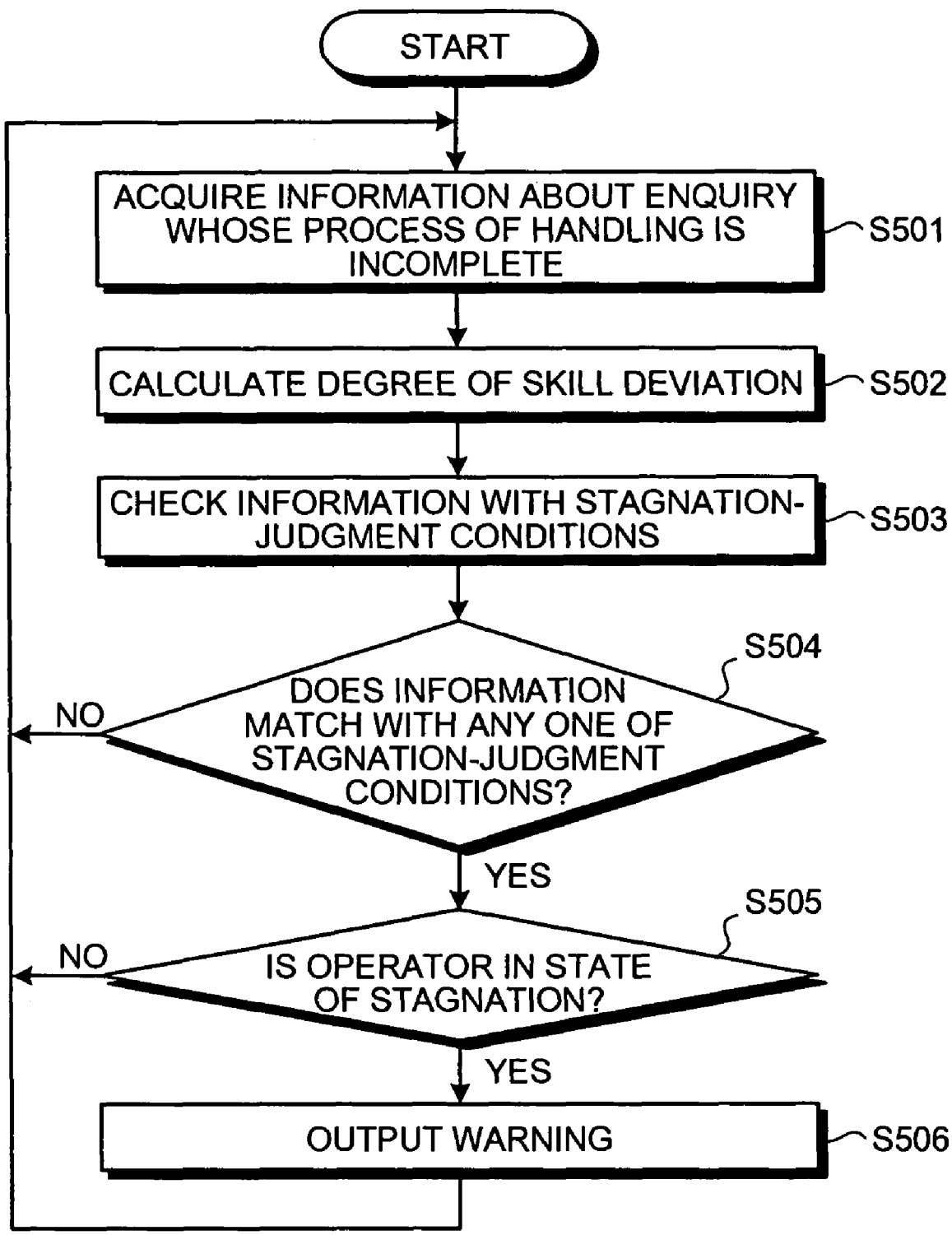
FIG. 11 is a flowchart of a process performed by a stagnation judgment unit shown in FIG. 5.

FIG. 11 is a flowchart of a process performed by the stagnation-judgment unit 414. As shown in FIG. 11, the stagnation-judgment unit 414 instructs the work-record acquiring unit 411 to acquire information about an enquiry whose handling process is incomplete from the enquiry history 320 and the work history 330 (step S501). According to acquired information, the stagnation-judgment unit 414 calculates the degree of skill-deviation of the operator who is referring to a reference material (step S502).

The acquired information is checked with the stagnation-judgment conditions 422 (step S503). When the acquired information matches with any one of the stagnation-judgment conditions 422 (Yes at step S504), it is determined as "stagnation". The stagnation-judgment unit 414 judges that the operator is in the state of stagnation (Yes at step S505), and instructs the warning unit 415 to perform the process of warning (step S506). After that, the stagnation-judgment unit 414 starts the process from step S501 for a next enquiry whose handling process is incomplete.

If the acquired information does not match with any of the conditions (No at step S504), or the result of the match is "normal" (No at step S505), the warning unit 415 is not caused to perform the warning process, and the stagnation-judgment unit 414 starts the process from step S501 for a next enquiry whose handling process is incomplete.

Configuration of the stagnation-judgment device 400, shown in FIG. 5, can be modified without departing from the scope of the invention. For example, function of the controlling unit 410 of the stagnation-judgment device 400 can be installed as software. When the software is executed by a computer, it is possible to realize the same function as the stagnation-judgment device 400. Explained below is a computer that executes a computer program (hereinafter, "stagnation-judgment program") as software to implement the controlling unit 410.

Figure 12:
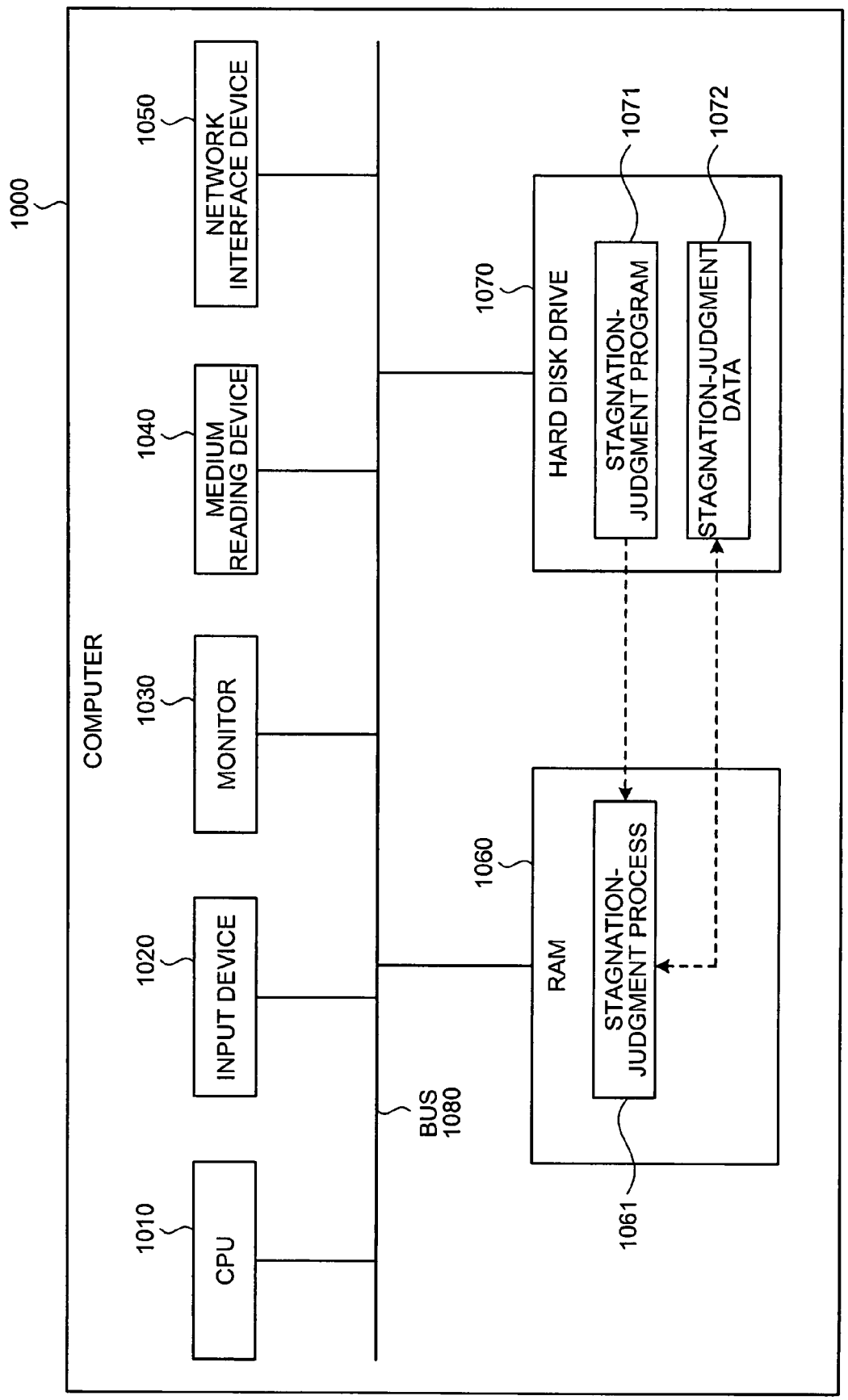
FIG. 12 is a functional block diagram of a computer that executes a stagnation-judgment program.

FIG. 12 is functional block diagram of a computer 1000 that executes a stagnation-judgment program 1071. The computer 1000 includes a central processing unit (CPU) 1010, an input device 1020 that inputs data from a user, a monitor 1030 that displays various information, a medium reading device 1040 that reads computer programs from a recording medium, a network interface device 1050 that exchanges data with another computer through a network, a random access memory (RAM) 1060, and a hard disk drive 1070, which are connected by a bus 1080.

The hard disk drive 1070 stores therein the stagnation-judgment program 1071 that has the function of the controlling unit 410 shown in FIG. 5, and stagnation-judgment data 1072 corresponding to variety of data stored in the storing unit 420 shown in FIG. 5. The stagnation-judgment data 1072 can be arbitrarily distributed to and stored in other computers connected to the computer 1000 via a network.

The CPU 1010 reads the stagnation-judgment program 1071 from the hard disk drive 1070 and loads the stagnation-judgment program 1071 into the RAM 1060. Thus, the stagnation-judgment program 1071 functions as a stagnation-judgment process 1061. In the stagnation-judgment process 1061, information and the like read from the stagnation-judgment data 1072 is loaded as required into an assigned area in the RAM 1060, and data processing is performed based on the loaded data.

The stagnation-judgment program 1071 need not be stored in the hard disk drive 1070. The stagnation-judgment program 1071 can be stored in a storing medium such as a compact disk-read only memory (CD-ROM). The stagnation-judgment program 1071 can be stored in another computer or a server that is connected to the computer 1000 via a public line, the Internet, a local area network or a wide area network, and the computer can read the program from these and execute it.

According to an aspect of the present invention, it is possible to prevent occurrence of stagnation during working at the call center.

Moreover, it is possible to grasp actions of the operator without any extra burden on the operator.

Furthermore, it is possible to judge occurrence of stagnation more appropriately according to variation in skills of operators.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program causing a computer to execute a process comprising:

acquiring a work record of an operator including first information regarding actions taken by the operator to handle a current inquiry from a customer and second information regarding actions taken by the operator to handle past inquiries;

acquiring a skill value of the operator;

deriving a correlation between the actions for handling past inquiries by the operator and stagnation based on the second information, the stagnation occurring when the operator does not transfer and keeps pending an inquiry that the operator is unable to handle;

judging whether the operator is in the state of stagnation by checking the first information with the correlation; and outputting a warning when the operator is judged to be in the state of stagnation, wherein the deriving includes deriving the correlation between the actions taken by the operator, skill of the operator, and stagnation based on the second information, and the skill value of the operator, and the judging includes judging whether the operator is in the state of stagnation by checking the first information, the skill value of the operator, and the correlation.

2. The non-transitory computer-readable recording medium according to claim 1, wherein the acquiring includes acquiring a record of material referred to by the operator as the work record.

3. The non-transitory computer-readable recording medium according to claim 1, wherein the acquiring includes acquiring a record of time taken by the operator to refer to the material as the work record.

4. A stagnation-judgment device comprising:
an acquiring unit that acquires a work record of an operator including first information regarding actions taken by the operator to handle a current inquiry from a customer and second information regarding actions for handling past inquiries by the operator;
a skill-value acquiring unit that acquires a skill value of the operator;
a deriving unit that derives a correlation between the actions for handling past inquiries by the operator and stagnation based on the second information, the stagnation occurring when the operator does not transfer and keeps pending an inquiry that the operator is unable to handle;
a judging unit that judges whether the operator is in the state of stagnation by checking the first information with the correlation; and
an outputting unit that outputs a warning when the operator is judged to be in the state of stagnation, wherein
the deriving unit derives the correlation between the actions taken by the operator, skill of the operator, and stagnation based on the second information, and the skill value of the operator, and
the judging unit judges whether the operator is in the state of stagnation by checking the first information, the skill value of the operator, and the correlation.

5. The stagnation-judgment device according to claim 4, wherein the acquiring unit acquires a record of material referred to by the operator as the work record.

6. The stagnation-judgment device according to claim 4, wherein the acquiring unit acquires a record of time taken by the operator to refer to the material as the work record.

7. A method of judging comprising:
acquiring, using a processor, a work record of an operator including first information regarding actions taken by the operator to handle a current inquiry from a customer and second information regarding actions taken by the operator to handle past inquiries;
acquiring, using a processor, a skill value of the operator;
deriving, using a processor, a correlation between the actions for handling past inquiries by the operator and stagnation based on the second information, the stagnation occurring when the operator does not transfer and keeps pending an inquiry that the operator is unable to handle;
judging, using a processor, whether the operator is in the state of stagnation by checking the first information with the correlation; and
outputting, using a processor, a warning when the operator is judged to be in the state of stagnation, wherein
the deriving includes deriving the correlation between the actions taken by the operator, skill of the operator, and stagnation based on the second information, and the skill value of the operator, and
the judging includes judging whether the operator is in the state of stagnation by checking the first information, the skill value of the operator, and the correlation.

8. The method according to claim 7, wherein the acquiring includes acquiring a record of material referred to by the operator as the work record.

9. The method according to claim 7, wherein the acquiring includes acquiring a record of time taken by the operator to refer to the material as the work record.

* * * * *